United States Patent
Raupach

(10) Patent No.: US 6,819,734 B2
(45) Date of Patent: Nov. 16, 2004

(54) METHOD FOR REMOVING RINGS AND PARTIAL RINGS IN COMPUTED TOMOGRAPHY IMAGES

(75) Inventor: Rainer Raupach, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 174 days.

(21) Appl. No.: 10/290,520

(22) Filed: Nov. 8, 2002

(65) Prior Publication Data

US 2003/0103595 A1 Jun. 5, 2003

(30) Foreign Application Priority Data

Nov. 9, 2001 (DE) .......................................... 101 55 089

(51) Int. Cl.$^7$ ............................................... A61B 6/03
(52) U.S. Cl. ............................... 378/4; 378/15; 378/901
(58) Field of Search ........................... 378/4, 8, 15, 901

(56) References Cited

U.S. PATENT DOCUMENTS

| 5,210,688 | A |   | 5/1993 | Cheu et al. .................... 378/19 |
|---|---|---|---|---|
| 5,717,791 | A | * | 2/1998 | Labaere et al. .............. 382/274 |
| 5,745,542 | A |   | 4/1998 | Gordon et al. .................. 378/4 |
| 6,094,467 | A |   | 7/2000 | Gayer et al. .................... 378/4 |
| 6,115,445 | A |   | 9/2000 | Lai ............................... 378/4 |

* cited by examiner

Primary Examiner—David V Bruce
(74) Attorney, Agent, or Firm—Harness, Dickey & Pierce P.L.C.

(57) ABSTRACT

An algorithmic method is used for suppressing artifacts in computed tomography raw data, on the basis of the determination and subsequent subtraction of a correction sinogram from a measured starting sinogram. The method includes high-pass filtering of a starting sinogram in the channel direction, and low-pass filtering in the projection direction in order to improve the signal-to-noise ratio. Thereafter, the magnitude of a weighted gradient of each data point in the low-pass-filtered sinogram is formed, both in the projection direction and symmetrically about the corresponding channel axis. The data point is eliminated if the change amplitude thereof exceeds a first defined threshold value. Residual data points are removed in the low-pass-filtered sinogram if their amplitude exceeds a second defined threshold value, and low-pass filtering of the resulting sinogram occurs in the form of averaging in the projection direction. The correction sinogram thus obtained is finally subtracted from the starting sinogram.

28 Claims, 6 Drawing Sheets

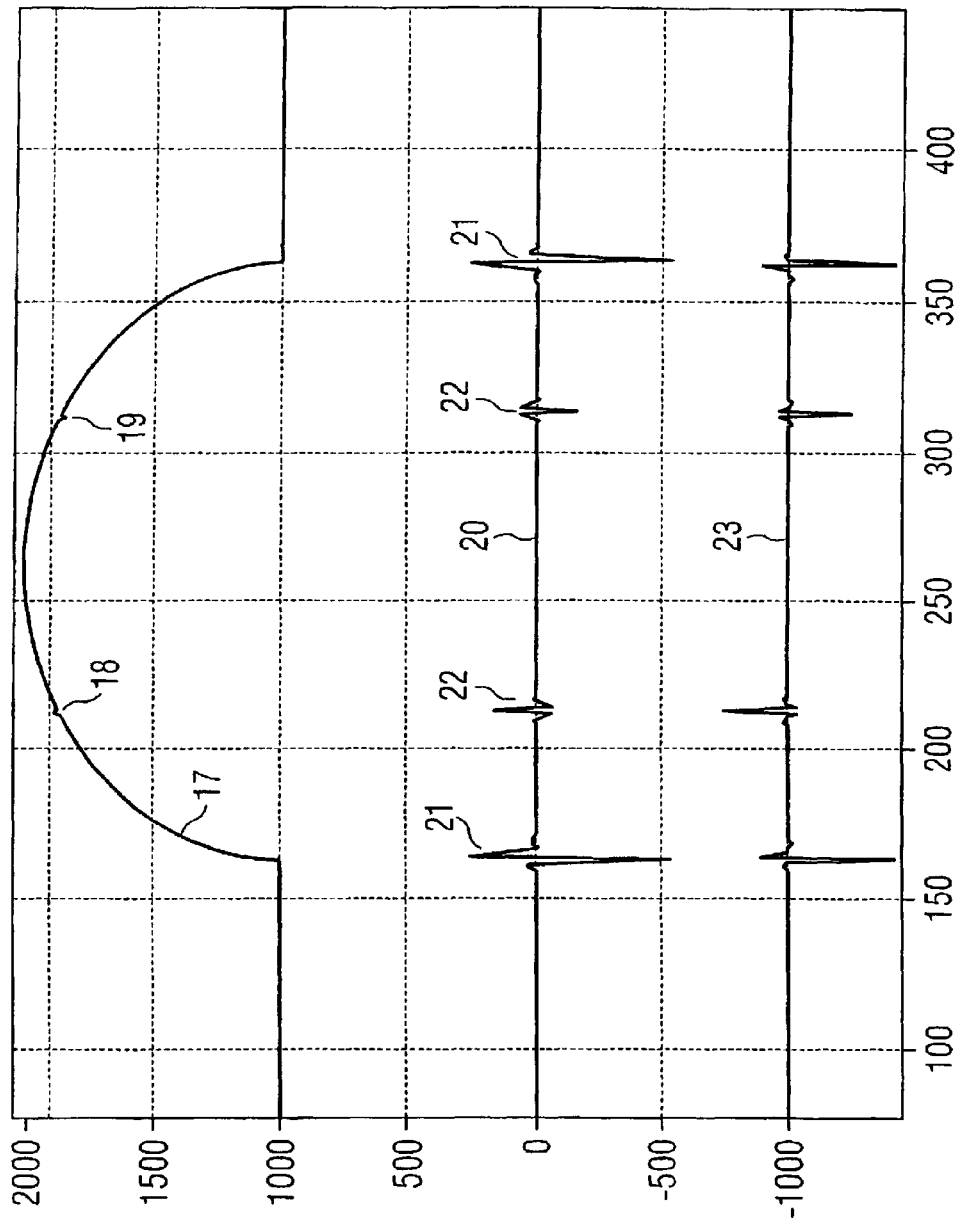

neu nach Schritt 4:
alt nach Tiefpass, (Schritt 3)

nach Median und Subtraktion, (Schritt 2)

nach Hochpass, (Schritt 1)

original,

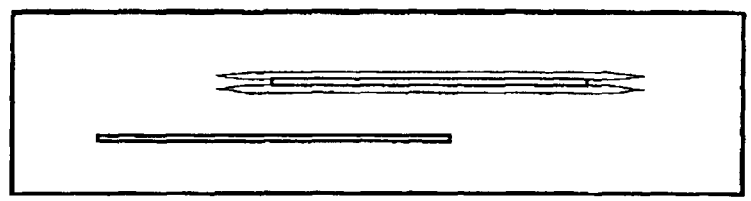
FIG 5G nach Schritt 6: alt
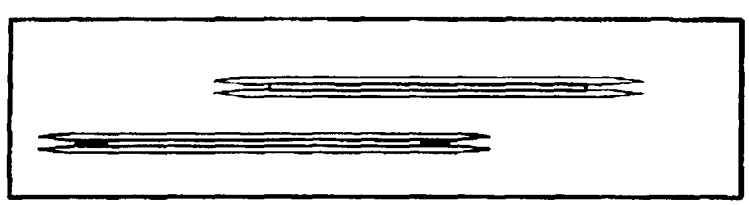
FIG 5H neu
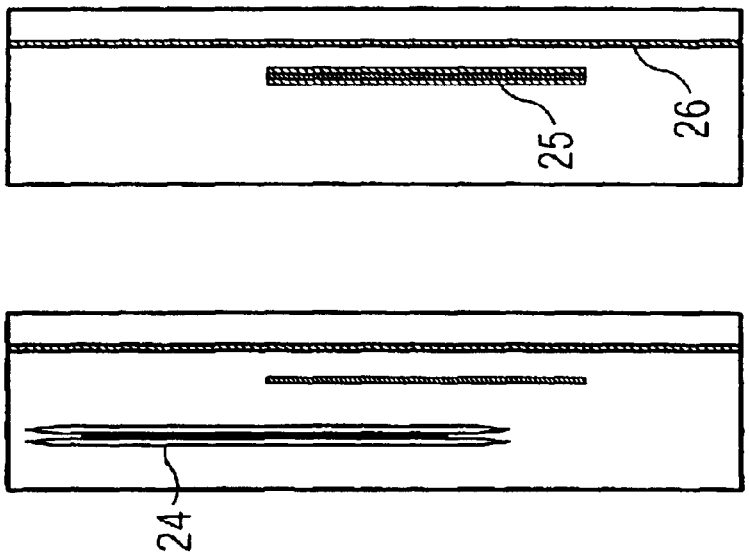
FIG 5I  FIG 5J  Korrigierte Sinogramme: alt  neu

METHOD FOR REMOVING RINGS AND PARTIAL RINGS IN COMPUTED TOMOGRAPHY IMAGES

The present application hereby claims priority under 35 U.S.C. §119 on German patent publication number DE 10155089.8 filed Nov. 9, 2001, the entire contents of which are hereby incorporated herein by reference.

BACKGROUND OF THE INVENTION

Image data of an examined measurement object can be obtained using modern medical diagnosis methods, such as X-ray computed tomography (CT), for example. The examined measurement object is generally a patient.

X-ray computed tomography—abbreviated to CT hereinafter—is a special X-ray recording method which fundamentally differs from the traditional X-ray tomography method in terms of image construction. CT recordings yield transverse sectional images, that is to say images of body layers which are oriented essentially perpendicularly to the body axis. The tissue-specific physical quantity represented in the image is the distribution of the attenuation value of X-ray radiation $\mu(x, y)$ in the sectional plane. The CT image is obtained by reconstructing the one-dimensional projections of the two-dimensional distribution of $\mu(x, y)$, which projections are supplied by the measurement system used, from numerous different viewing angles.

The projection data are determined from the intensity I of an X-ray after it has passed through the layer to be imaged and its original intensity $I_0$ at the X-ray source in accordance with the absorption law $$\ln \frac{I}{I_0} = -\int_L \mu(x, y) dl \tag{1}$$

The integration distance L represents the path of the X-ray considered through the two-dimensional attenuation distribution $\mu(x, y)$. An image projection is then composed of the measured values of the line integrals through the object layer, with the measured values being obtained with the X-rays of a viewing direction.

The projections—characterized by the projection angle $\alpha$—originating from many different directions are obtained by a combined X-ray tube detector system which rotates about the object in the layer plane. The most common apparatuses at the present time are so-called "fan beam apparatuses", in which a tube and an array of detectors (a linear arrangement of detectors) rotate in the layer plane jointly about a center of rotation, which is also the center of the circular measurement field. "Parallel beam apparatuses", which exhibit very long measurement times, are not explained here. It shall be pointed out, however, that a transformation from fan to parallel projections and vice versa is possible, so that the present invention, which will be explained with reference to a fan beam apparatus, can also be used for parallel beam apparatuses without any restriction.

In the case of fan beam geometry, a CT recording comprises line integral measured values—$\ln(I/I_0)$ of arriving beams which are characterized by a two-dimensional linkage of the projection angle $\alpha \in [0, 2\pi)$ and the fan angles $\beta \in [-\beta_0, \beta_0]$ defining the detector positions ($\beta_0$ is half the fan aperture angle). Since the measurement system only has a finite number k of detector elements and a measurement comprises a finite number y of projections, this linkage is discrete and can be represented by a matrix:

$$\tilde{p} + \tilde{I}(\alpha_y, \beta_k) [0, 2\pi) \times [-\beta_0, \beta_0] \tag{2}$$

or $$\tilde{p} + \tilde{I}(y, k): (1, 2, \ldots N_P) \times (1, 2, \ldots N_S) \tag{3}$$

The matrix $\tilde{p}(y, k)$ is called a sinogram for fan beam geometry. The projection number y and the channel number k are of the order of magnitude of 1000.

The principle of image reconstruction in CT by calculating the $\mu$ value distribution will not be discussed further, for the sake of brevity. This is illustrated in detail, for example, in "Bildgebende Systeme für die medizinische Diagnostik" ["Imaging Systems for Medical Diagnosis"], third edition, Munich: Publicis MCD Verlag, 1995, ed.: Morneburg, Heinz, ISBN 3-89578-002-2.

However, the task of image reconstruction is not yet concluded with the calculation of the $\mu$ value distribution of the radiographed layer. In the medical field of application, the distribution of the attenuation coefficient $\mu$ represents only an anatomical structure which still has to be represented in the form of an X-ray image.

After a proposal by G. N. Hounsfield, it has become generally customary to transform the values of the linear attenuation coefficient $\mu$ (which has the dimension unit $cm^{-1}$) to a dimensionless scale in which water acquires the value 0 and air the value −1000. The conversion formula to this "CT number" reads as follows:

$$CT \text{ number} = \frac{\mu - \mu_{Water}}{\mu_{Water}} 1000 \tag{4}$$

The unit of the CT number is called a "Hounsfield Unit" (HU). This scale is highly suited to the representation of anatomical tissue since the unit HU expresses the deviation in thousandths of $\mu_{water}$ and the $\mu$ values of most substances inherent to the body differ only little from the $\mu$ value of water. From the range of numbers (from −1000 for air to approximately 3000), only integers are used as carriers of image information.

However, the representation of the entire scale range of about 4000 values would far surpass the discrimination capability of the human eye. Moreover, the observer is often interested only in a small excerpt from the range of attenuation values, e.g. the differentiation of grey and white brain substance, which differ only by about 10 HU.

For this reason, so-called image windowing is used. In this case, only part of the CT value scale is selected and spread over all available grey shades. Even small attenuation differences within the chosen window thus become perceptible grey tone differences, while all the CT values below the window are represented black and all the CT values above the window white. The image window can be varied arbitrarily but in terms of its central level and in terms of its width.

The image data obtained usually contained not only the desired image information of the examined measurement object but also information which can be attributed to disturbing influences during the measurement operation.

Generally, a distinction is made between two different categories of problems which reduce the quality of the image data obtained: image noise and artifacts. These two problems will be explained in more detail below.

Image noise can in turn be subdivided into a plurality of causes.

The main part of the image noise is brought about by the quantum noise which results from the fact that each radiation comprises a finite number of quanta, so that the number of measured quanta always virtuates normally distributed about an average value.

Further causes of the image noise are the usually not exactly monochromatic quanta of the X-ray tubes that can be realized in practice, and scattered radiation due to interactions between the X-ray radiation used and the electron shell of atoms during transmission through the measurement object.

Artifacts are also subdivided further: aliasing, partial volume artifacts, hardening artifacts and motion artifacts are typical artifacts whose occurrence depends in particular on the geometry or a motion of the measurement object.

Effects corresponding to the above-described image noise and the artifacts can also be found in other imaging systems for medical diagnosis.

Ring artifacts constitute a particular form of artifacts the cause of which is to be sought primarily in the computer tomography imaging system itself that is used:

As already described above, a plurality of detectors (up to 1000) are used in fan beam apparatuses. Therefore, there is the possibility of inadequate calibration of the individual detectors. In other words, identical attenuations of the radiation penetrating through the measurement object are measured differently by different detectors.

In the case of inadequate calibration of the individual detectors of a computer tomograph, the image data obtained have concentric rings or partial ring arcs about the center of rotation, which have no actual reference to the measurement object considered. This occurs on account of the rotation of the beam source and of the detectors about the measurement object during the measurement operation. Such disturbances in the image data are called ring artifacts.

The order of magnitude of the differential channel errors is approximately a factor of less than or equal to $\pm 2 \times 10^{-3}$ of the detected intensity. Although these errors cause the measured value to deviate from the "true" value usually only by a few thousandths, they bring about distinctly visible ring artifacts in the image. The rings or partial rings have an amplitude of ±20 HU.

In order to eliminate ring artifacts in the sinogram or in the X-ray image, there are various procedures in the prior art:

The patent specification U.S. Pat. No. 5,210,688 A illustrates a method for suppressing apparatus-dictated "discontinuities" in the sinogram which are presented as ring artifacts in the later CT image. The method is based on the determination and subsequent subtraction of a correction sinogram from the starting sinogram. To that end, the data are fourier-transformed in order then to separate channel errors from object structures in the frequency domain by low-pass filtering.

In the patent specification U.S. Pat. No. 5,745,542 A, actual channel errors are separated from signal structures in the correction sinogram by evaluation of a histogram, low-pass filtering being effected in the projection direction and high-pass filtering being effected in the channel direction.

In the patent specification U.S. Pat. No. 6,115,445 A, in order to create the correction sinogram, likewise a low-pass filtering is carried out in the projection direction and a high-pass filtering is carried out in the channel direction. However, the differentiation between useable object signals and error signals to be eliminated is effected by means of a weighting and limiting unit which carries out an error signal estimation using so-called weighting factors.

The patent specification U.S. Pat. No. 6,094,467 A discloses, for the purpose of identifying object edges (in the case of high-intensity metal implants with respect to the CT imaging, which as such considerably impair the CT image quality), evaluating $A(i,\theta)$ through the second derivative of the attenuation values (sinogram values) according to the channel number i ($\theta$ is the respective projection).

Further methods for eliminating ring artifacts in the sinogram or in the X-ray image which comprise parts of the abovementioned method steps are the algorithms known:

a) Raw data balancing method

In this case, the channel errors which are identified in the sinogram by line-like structures are detected and corrected.

b) Image balancing method

Rings and partial rings represented in the image on account of channel errors are identified and corrected directly in the image.

It has been shown empirically that b) generally acts more efficiently than a), but in the vicinity of the center of rotation the correction can itself produce artifacts on account of a lack of statistics during the detection of rings. Therefore, the raw data balancing method is advantageous for the channels in the surroundings of the center of rotation—the term channel is used to denote the connecting straight line from the (point) X-ray source to a detector element.

SUMMARY OF THE INVENTION

The present application, in a preferred embodiment, can constitute a considerable further development of the raw data balancing method, for which reason the latter will be described below:

The method may be based on the following assumptions:

1. The ring artifacts to be corrected ought to sweep over a minimum angle of 30° in the image. Accordingly, a channel error lasts for at least $N_p/12$ successive projections.

2. The error amplitude (the ring) must not exceed a certain limit value (presently 15 attenuation units).

The so-called "balancing procedure" serves—as mentioned above—for correcting CT raw data (which are represented in the sinogram) whose associated image has ring-shaped artifacts. These errors must be identified by the method and distinguished from "genuine" structures of similar appearance.

The balancing method has the following substeps:

I) Compression

Firstly, by use of an averaging compression in $\alpha$, the volume of data is reduced and noise smoothing is carried out.

II) High-pass filtering

A high-pass filtering in the direction $\beta$ subsequently emphasises the differential channel errors.

III) $\alpha$ low-pass filter 1

An $\alpha$ low-pass filter attenuates short-range structures, which makes it possible to distinguish channel errors from high-frequency structures.

IV) $\alpha$ differentiator

Through $\alpha$ difference formation, signal structures not oriented in the $\alpha$ direction remain discernible.

V) Decision unit

A decision as to whether or not there are channel errors is taken with the aid of an amplitude and an $\alpha$ gradient threshold value decision.

VI) $\alpha$ low-pass filter 2

The short-range structures in $\alpha$ which are present after the decision and are not channel errors are weakened in terms of their influence by a second $\alpha$ low-pass filter.

VII) Decompression

VIII) Correction

The correction is finally effected by subtracting the correction sinogram obtained from the measured sinogram.

The respective steps will now be specifically discussed in more detail.

In this case, reference is made to the representation of the sinogram in which the preprocessed CT values—called CT raw data—represent the attenuation values S(y, k). The channels k of a projection are plotted horizontally and the projection numbers y—both beginning with 1 in each case—are plotted vertically:

| Projection Channel → | |
|---|---|
| ↓ | 1, 2, ... k ... NDET |
| 1 | ... S(1, k) ... |
| 2 | |
| . | |
| . | |
| . | |
| i | ... S(i, k) ... |
| . | |
| . | |
| NPRO | ... S(NPRO, k) ... |

I) Compression

In order to reduce the computation time and because the channel errors to be removed have a minimum extent in the projection direction, it is expedient, for the further operations, to reduce the number of projections used for the correction. This is done by arithmetic averaging of N projections, i.e. a new sinogram is created which now contains NPRO/N projections:

$$Comp(y, k) = \left(\frac{1}{N}\right) \sum_{i=N\cdot(y-1)+1}^{y\cdot N} S(i, k) \quad (5)$$

where y=1,2 ... NPRO/N and NPRO/N=NCOMP.

The factor N depends on the number of projections per circulation. N is chosen such that the distance between two compressed projections corresponds to a circulation angle α of approximately 3°. These are approximately 120 projections in the case of a full circulation.

As stated, although a compression is expedient, it does not necessarily have to be carried out.

II) High-pass Filtering

In compressed sinograms, too, the channel errors continue in successive compressed projections. Since the errors are very small, however, and, moreover, only the differential amplitude error with regard to the adjacent channels is intended to be corrected, it is possible to perform a suitable high-pass filtering in the channel direction (β direction):

$$\text{High-pass}(y, k) = \sum_{i=\frac{L}{2}}^{\frac{L}{2}} Comp(y, k - i) \cdot hp(i) \quad (6)$$

The effect of the high-pass filter in the image and sinogram region is characterized in that low-frequency components are eliminated but ring artifacts and structures with high-frequency components in the radial direction are emphasized. Since the object has a long-wave profile, it is filtered out by the high-pass filter. What remain, on the one hand, are high-frequency channel errors which are removed at the end of the method by subtraction of the correction sinogram from the original sinogram. On the other hand, sharp object edges are also identified as high-frequency structures, not filtered out and included in the correction sinogram. Thus, important object structures would be incorrectly eliminated after the sinogram correction. This is to be prevented, however, in the α differentiator in step IV).

In order to eliminate so-called outliers, a median filter may likewise optionally be used after the high-pass filtering. The median filter also avoids the situation where channel errors are easily smeared out in the high-pass filtering.

III) α Low-pass Filter 1

As mentioned in the introduction, ring artifacts in the image ought to have a minimum extent of 30 degrees. "Genuine" structures which are arranged in a ring-shaped manner but have a smaller extent are not to be removed. To that end, a smoothing operation is introduced in the projection direction, which smoothing operation reduces the amplitude of short structures but retains the amplitude of extended rings.

$$\text{Low-pass1}(y, k) = \sum_{i=-\frac{L}{2}}^{\frac{L}{2}} \text{High-pass}(y - i, k) \cdot tp(i) \quad (7)$$

In addition, this reduces the noise and thus increases the deduction reliability. This smoothing in the projection direction makes it possible to isolate channel errors and eliminate noise.

It may be, however, that objects (e.g. skull bones) cause lines in the sinogram which are very similar to those of the channel or amplitude errors. Such structures must likewise be eliminated in order that they are not retouched away during the correction. To that end, the step of differentiation in the projection direction is used.

IV) α Differentiator

In order to detect structures that are not (exactly) ring-shaped and are distinguished by great change in the projection direction, the smoothed signal is "differentiated" in the projection direction.

$$Diff(y,k) = \text{Low-pass1}(y,k) - \text{Low-pass1}(y-1,k) \quad (8)$$

This operation is an approximation of the first derivatives in the α direction or of the subtractive parts of the first derivative (gradient) in the image region:

$$\frac{\partial}{\partial \alpha}\text{Low-pass1}(y, k) = \frac{\text{Low-pass1}(y + \Delta y, k) - \text{Low-pass1}(y, k)}{\Delta y} \quad (9)$$

If in equation (9) Δy=1 (best possible approximation), the following results $$\frac{\partial}{\partial \alpha}\text{Low-pass1}(y, k) \approx Diff(y, k) \quad (10)$$

Although signal structures that are not oriented in the α direction and signal structures that are oriented in the α direction with rapidly variable amplitude are altered, they nonetheless remain discernible. Data structures of whole rings and partial rings are eliminated. In other words, structures which cannot be assigned to a channel error, but rather are caused by absorbing objects, are eliminated, to be precise on the basis of the assumption that a channel error varies only slightly over time, but an object edge effects a rapid variation.

V) Decision Unit

The decision as to whether or not rings are present is made through two amplitude thresholds. Specifically, it may be that a structure has been detected which, incorrectly, was not a ring but rather, however for example, a sharp bone edge (such a structure generally has a very high amplitude). If the magnitude of the derivative exceeds one of the thresholds defined below, then the assigned data point is removed in order that this in actual fact anatomical structure is not taken into account later during the sinogram subtraction.

1) If the magnitude of the absolute value of the differentiated signal Diff(y, k) lies below the gradient threshold S4<0, it is assumed that what is involved is a ring whose amplitude has been calculated in the sinogram Low-pass1(y, k). Otherwise, this value is set to 0.
2) If the magnitude of the absolute value of the sinogram |Low-pass1(y,k)| is greater than an amplitude threshold S3>0, then the value is limited to ±S3. This is intended to reduce the effect of incorrect corrections.

The threshold value operations can be described as follows:

| | |
|---|---|
| Dec(y,k) = Low-pass1(y,k), | if \|Diff(y,k)\| ≦ S4 |
| Dec(y,k) = 0, | if \|Diff(y,k)\| > S4 (11) |
| Dec(y,k) = S3, | if Dec(y,k) > S3 |
| Dec(y,k) = −S3, | if Dec(y,k) < −S3 |

The threshold S3 is channel-independent, and S4 is channel-dependent. The threshold S4i holds true in a central channel region, and S4a holds true peripherally (S4i>S4 a). Identification conditions in the outer channel region are stricter than in the central channel region (S4i=2*S4a holds true in the outer region). The inner region of a projection usually contains higher-frequency data structures than the outer region. The risk of elimination of channel errors through an excessively low gradient threshold is then greater.

To summarize, it may be stated that, assuming that channel errors have amplitudes in a restricted range and, as a result, the data are limited by a threshold, a generation of artifacts on account of objects not identified in step IV) can be counteracted by step V).

VI) α Low-pass Filter 2

A concluding α low-pass filtering of the sinogram generated by the decision unit is intended to smooth the sudden amplitude changes generated by the threshold value operations.

The edge effects discussed above are thus largely eliminated. Since a minimum extent of 30° was assumed in the ring detection, object structures having an extent of a few millimeters would also be identified as rings and removed in the detector center (in the central channel region). Therefore, a smoothing of significantly greater range by means of a second α low-pass filter is used in a region around the detector center. For the central region of the detector channels k, equation (12) holds true where e.g. L=25:

$$\text{Low-pass2}(y, k) = \sum_{i=-\frac{L}{2}}^{\frac{L}{2}} Dec(y - i, k) \cdot tp2i(i) \quad (12)$$

For the outer region of the detector channels k, the following holds true:

$$\text{Low-pass2}(y, k) = \sum_{i=-\frac{L}{2}}^{\frac{L}{2}} Dec(y - i, k) \cdot tp2a(i) \quad (13)$$

where e.g. L=9

VII) Decompression

If a data compression was carried out at the beginning of the method, a data decompression now takes place by means of an inverse procedure with respect to the data compression.

VIII) Correction

The data contained in Low-pass2(y,k) represent the correction sinogram, which is now subtracted from the input sinogram. In this case, each correction projection Low-pass2 (ycomp, *) is applied to n input projections.

$$\text{Result}[(y-1)*N+i,k]=S[(y-1)*N+i,k]-\text{Low-pass 2}(y,k) \quad (14)$$

where y=1,2 ... NPRO/N and i=1,2 ... N

The balancing method would thus be completely outlined. In order to preclude the situation where the balancing method for its part generates artifacts in addition to a satisfactory optimizing effect through definition of the thresholds in steps IV) and V), the smoothing interval in step VI) must be chosen to be large—usually of the order of magnitude of half a rotation.

If the length of the smoothing interval is reduced, then the method becomes critical with regard to the generation of artifacts. By way of example, if the sharp edge of an object (e.g. skull bones) runs "parallel" to the projection axis for a relatively long time, then this is not identified as such in step IV), as will be illustrated later with reference to the descriptive figures. Through a smoothing in accordance with step VI) in the form of averaging over a short smoothing interval, values with a high amplitude remain as a consequence along one or more adjacent channels. Despite the smoothing with a shortened smoothing interval in step VI), these values lead to considerable corrections. That becomes apparent in the image through partial rings having approximately half the length of the smoothing interval which, as it were, are drawn out or smeared out from the object structure (e.g. of the radial skull bone) in a streaky manner.

The smoothing interval of the order of magnitude of half a rotation which is defined in step VI) also has crucial disadvantages, however:

By virtue of the fact that structures which are to be assigned to objects are eliminated, in these regions of the sinogram it is no longer possible to determine the channel amplitude to be corrected. If, by way of example, on average, half of the projections are removed in the context of the differentiation in step IV), then the correction amplitude calculated in step VI) amounts to only half of the true error, since, after all, averaging was effected over 100%. A ring to be corrected thus remains after the correction with about half the amplitude and cannot, therefore, be eliminated.

It is an object of an embodiment of the present invention, therefore, to further improve the balancing method and the CT apparatus for carrying out this method.

The abovementioned object may thus be achieved by an improvement of the balancing method Thus, in one embodiment, a method for suppressing artifacts in computer tomography raw data is proposed, which method, in different steps, determines a correction sinogram and subtracts the latter from a starting sinogram. The determination of the correction sinogram has the following steps:

high-pass filtering of a starting sinogram in the channel direction in order to filter out the long-wave structures caused by anatomical objects, first low-pass filtering of the high-pass-filtered sinogram in the projection direction in order to improve the signal-to-noise ratio, formation of the magnitude of a weighted gradient of each data point in the low-pass-filtered sinogram both in the projection direction and symmetrically about the corresponding channel axis, which specifies the amplitude of a change in an arbitrary direction in the sinogram, and elimination of the data point if the change amplitude thereof exceeds a first defined threshold value, removal of residual data points in the low-pass-filtered sinogram if their amplitude exceeds a second defined threshold value, second low-pass filtering (long-range smoothing) of the resulting sinogram in the form of averaging in the projection direction.

The correction sinogram thus obtained is finally subtracted from the starting sinogram.

This method allows an excellent identification of object structures in particular by means of the third step, so that said structures are removed in the correction sinogram and, accordingly, left in the starting sinogram, that is to say are not corrected. A further advantage is that, in the last step of the method, the smoothing interval is permitted to be significantly shortened without the method becoming critical with regard to the generation of artifacts, since, after all, all the object structures have been identified as such and removed in the correction sinogram. Reducing the smoothing interval also has the advantage, however, that the number of projections to be buffered in the computer can be drastically reduced owing to the averaging over fewer—to be precise significantly fewer—projections. The advantage consists in sparing the resources that are to be provided for the computer tomography, such as, for example, the main memory or the data transfer in the apparatus. In an advantageous manner, this also reduces the delay from the first data recording up to the generation of the CT image in the context of an "image reconstruction pipeline".

In order to obtain a better correction quality, the high-pass filtering step may advantageously be followed by median filtering of the high-pass-filtered sinogram in the channel direction.

The gradient is advantageously weighted by empirically defined scale parameters with regard to the channel or projection direction.

It is furthermore advantageous if the smoothing interval is significantly shortened in the second low-pass filtering step.

In order to reduce the computation time, as first step of the method, the number of projections used for the correction can be reduced by an averaging compression in the projection direction and can be decompressed again after the entire correction by use of an inverse procedure.

The method according to an embodiment of the invention can be implemented on a computer of a computed tomography apparatus in which the individual signal processing steps are carried out.

The method according to an embodiment of the invention can furthermore also be realized as a computer program.

BRIEF DESCRIPTION OF THE DRAWINGS

Further features, properties and advantages of the present invention will now be explained using exemplary embodiments and with reference to the accompanying figures of the drawings.

FIG. 4 shows a diagram for demonstrating the mode of action of the high-pass filter using a cylinder phantom, FIGS. 5a to 5j show the mode of action of the method on theoretical sinograms.

DETAILED DESCRIPTION OF THE PREFERRED EMBODIMENTS

Figure 1:
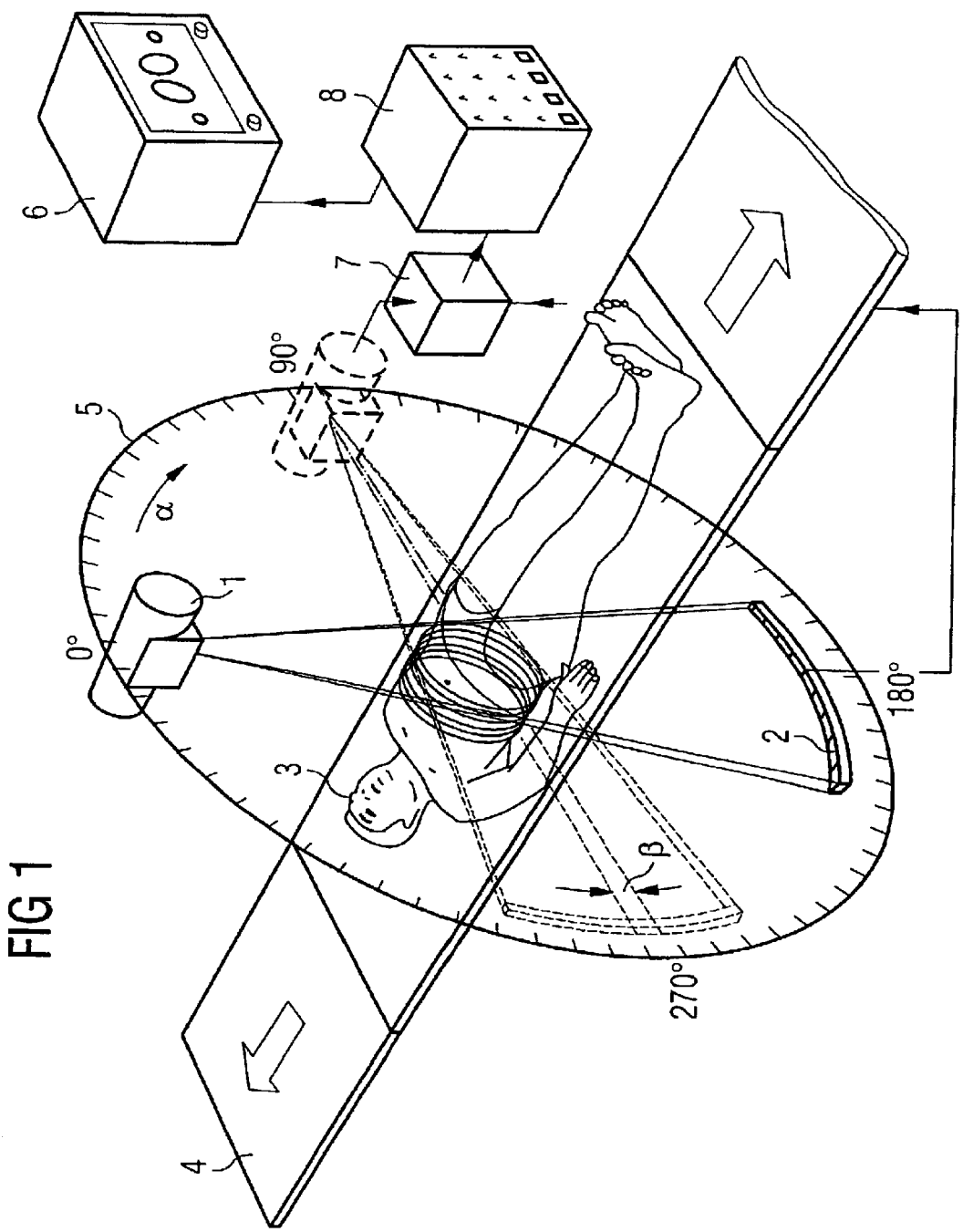
FIG. 1 diagrammatically shows a CT apparatus for a fan beam method which works in accordance with an embodiment of the present invention.

FIG. 1 diagrammatically illustrates a computed tomography apparatus for a fan beam method which works in accordance with an embodiment of the present invention. In this apparatus, X-ray tube 1 and beam receiver 2 (detectors) rotate jointly about a center of rotation, which is also the center of the circular measurement field 5, and in which the patient 3 to be examined is situated on a patient's couch 4. In order to be able to examine different parallel planes of the patient 3, the patient's couch can be displaced along the longitudinal axis of the body.

As can be discerned from the drawing, CT recordings yield transverse sectional images, that is to say images of body layers which are oriented essentially perpendicularly to the body axis. This layer representation method represents the distribution of the attenuation value $\mu_z(x,y)$ itself (z is the position on the longitudinal axis of the body).

Computed tomography (called CT hereinafter) requires projections at very many angles $\alpha$. In order to generate a radiographic recording, the beam cone emitted by the X-ray tube 1 is masked out in such a way that a plane beam fan is produced which outlines one-dimensional central projections of the radiographed layer. For exact reconstruction of the distribution of the attenuation values $\mu_z(x,y)$, this beam fan must be perpendicular to the axis of rotation and, moreover, be spread to an extent such that it completely covers the envisaged layer of the measurement object from every projection direction $\alpha$. This beam fan penetrating through the object is captured by detectors which are arranged linearly on a circle segment. These are up 1000 detectors in commercially available apparatuses. The individual detector reacts to the arriving beams with electrical signals whose amplitude is proportional to the intensity of said beams.

Each individual detector signal associated with a projection $\alpha$ is respectively picked up by an electronic measurement unit 7 and forwarded to a computer 8. By means of the computer 8, the measured data can then be processed in a suitable manner and be visualized firstly in the form of a sinogram (in which the projection $\alpha$ is plotted as a function of the measured values of the corresponding channel $\beta$) in so-called Gordon units, but finally in the form of a natural X-ray image in Hounsfield units on a monitor 6.

However, for various physical reasons—as already mentioned further above—the detectors (which are also referred to as channels hereinafter) may supply signals exhibiting errors. In contrast to an ideal detector, a real detector has, inter alia, the following weaknesses:

a) The signal of the detector does not disappear in the absence of radiation (the term used here is "dark current").

b) The relationship between intensity and the signal is nonlinear.

These effects can be corrected to a certain degree in the context of the preprocessing—carried out in the computer 8—by use of, for example, an offset correction and/or by use of a polynomial fit, as is carried out in a so-called Channel Correction (CCR, Channel Correction by measuring the attenuation of a plurality of phantoms introduced into the beam path) up to, for example, the second order. On account of e.g. temperature dependencies, however, an "ideal" data record is generally not available even after the preprocessing.

Not all channels have identical properties. Therefore, the entire sinogram is also not altered in the same way. Even after the reconstruction, errors of individual (isolated) channels still lead to clearly visible rings—even to point- or head-shaped structures in the center of rotation—in the CT images. Such image errors are relevant with regard to the diagnosis.

It is an aim of an embodiment of the present invention to use a suitable raw data correction method, which is ultimately intended to be implemented and carried out in the computer 8, to reduce the channel-error-dictated artifacts in the sinogram and finally in the CT image.

Such a raw data correction method has already been outlined further above and represents the basis for the present invention. Individual steps of this method will be explained in more detail with reference to the figures below.

Figure 2:
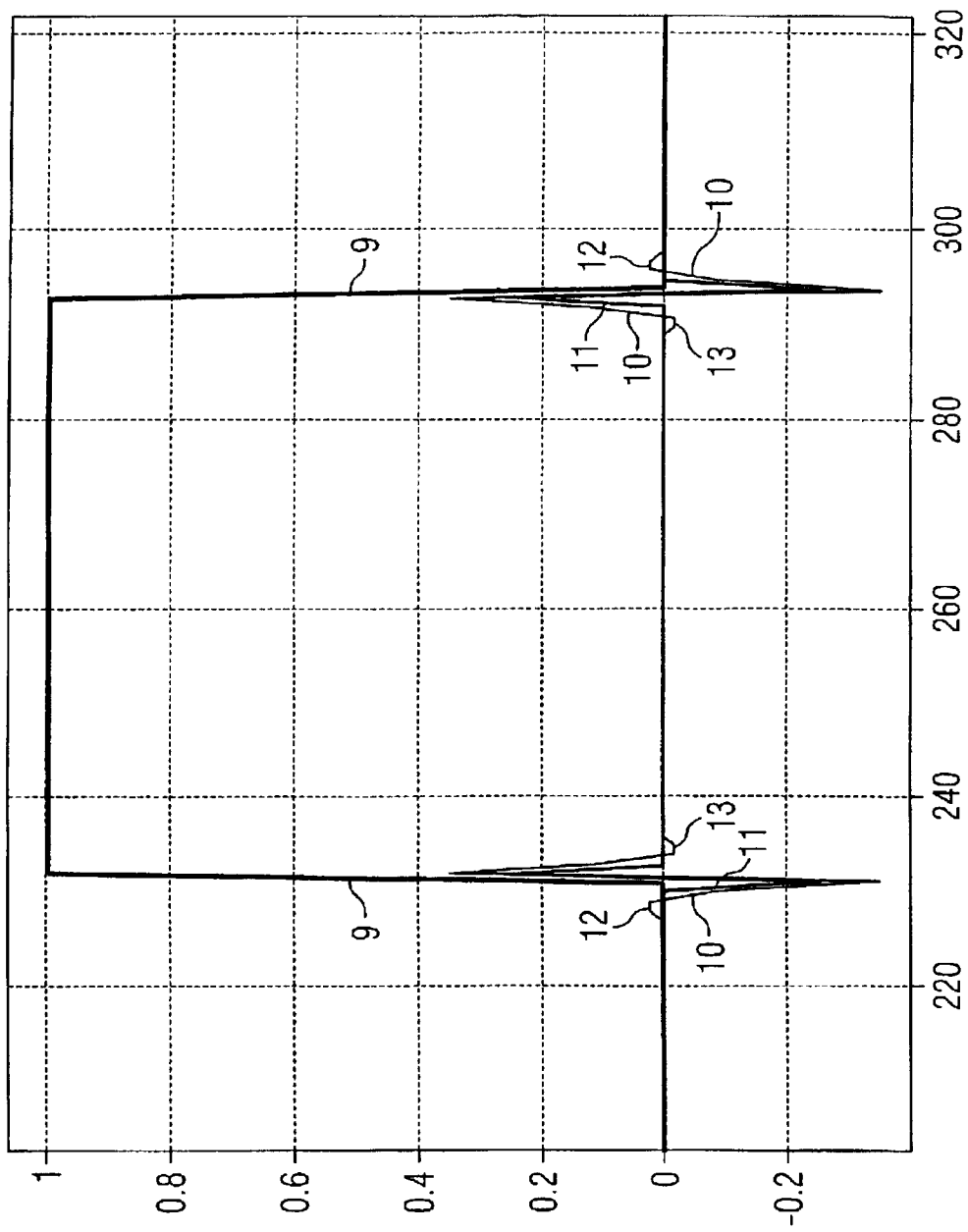
FIG. 2 shows a diagram for demonstrating the mode of action of the high-pass filter.

FIG. 2 shows a diagram for demonstrating the mode of action of the high-pass filter which is used in method step II) and which is used after an optional data compression in the projection direction in accordance with step I) of the method. The representation shows a fictitious projection, i.e. an attenuation value as a function of the channel number $\beta$ for a defined projection $\alpha$ (curve 9). Curve 10 represents the result after application of the high-pass filter, that is to say after the first step of the method according to the invention. The jag directed firstly downward then upward is typical as a response to a rising edge of the curve 9. If the edge falls, then the orientation of the jag is reversed. The precise form of the jags depends on the characteristic of the respective high-pass filter used. By way of example, the small overshoots 12 and undershoots 13 should be taken into consideration. Finally, curve 11 shows the result after a median filtering and subsequent subtraction in the sinogram. The median filtering, which can likewise be used optionally, thus generates a new starting sinogram which is improved with regard to the correction quality; the overshoots 12 and undershoots 13 are eliminated in curve 11.

Figure 3:
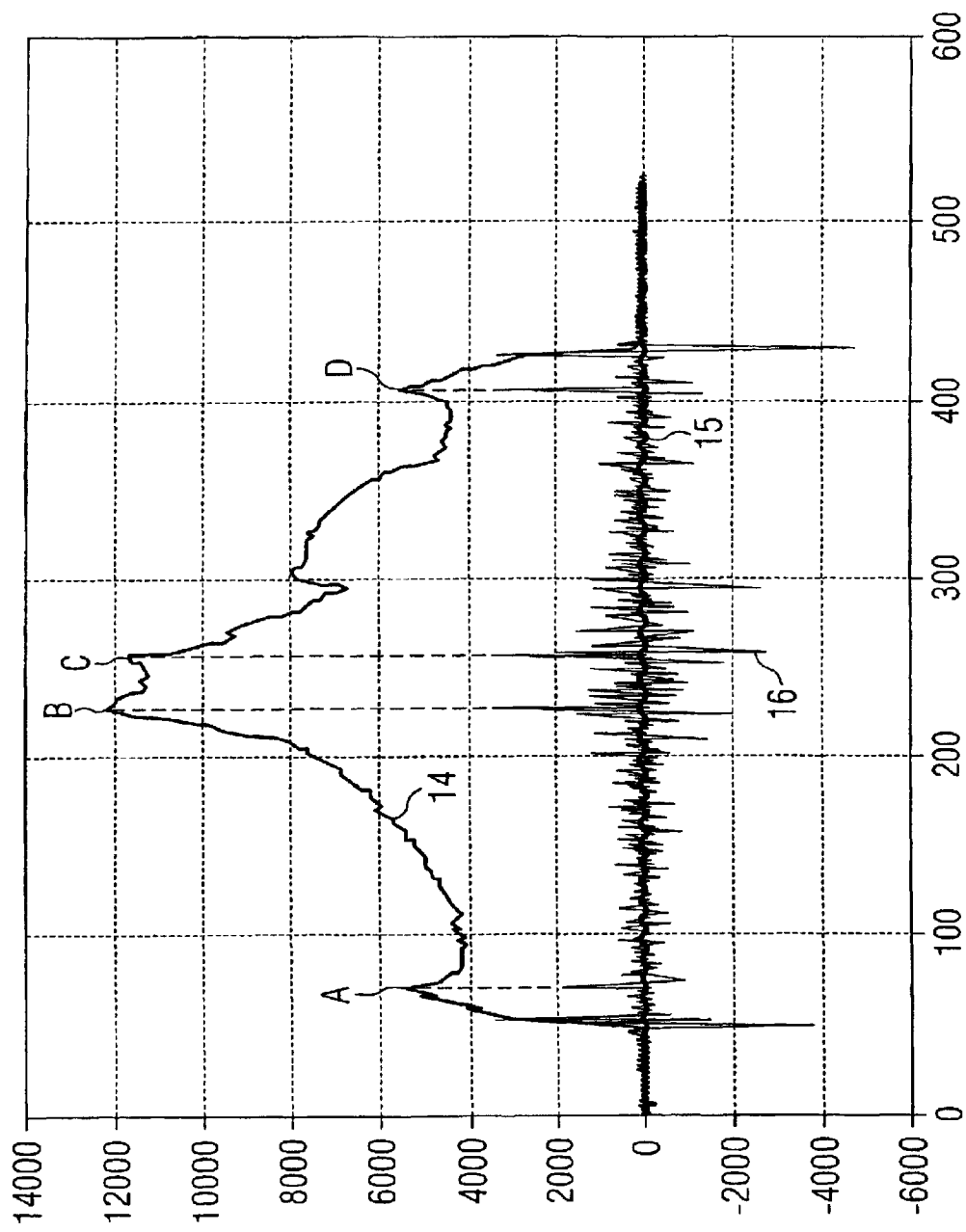
FIG. 3 shows, in the diagram, typical attenuation values of the CT signal of a real projection of a skull scan.

FIG. 3 then shows a real projection of a skull scan (curve 14). The bold face graph (curve 15) along the horizontal (channel) axis shows the result after the high-pass filtering. The amplitude of the filtered signal 15 is so weak because the amplitudes of the attenuation values over the channels change much more slowly than in FIG. 2. In order nevertheless to illustrate the correlation: large change in the output signal—high amplitude of the filtered signal, the filtered signal has been multiplied by the factor 20 (curve 16). As can be seen at the locations A, B, C and D, here, too, large rises in the unfiltered signal are translated into large amplitudes of the signal downstream of the high-pass filter.

FIG. 3 reveals that the attenuation values of the CT signal are of the order of magnitude of 10,000 Gordon units. The CT amplitudes of channel errors which are sought in the correction method are smaller than 10 Gordon units, that is to say are not visible on the scale of FIG. 3.

In order nevertheless to visualize channel errors, FIG. 4 illustrates the projection 17 of a homogeneous phantom in the form of a cylinder in idealized fashion (i.e. without noise). The CT values are shifted vertically upward by an offset in order to be able to better discern the signal filtered by the high-pass filter. Channel errors are now manifested as small localized depressions and elevations on the projection 17. In FIG. 4, by way of example a small positive channel error 18 is incorporated to the left of the maximum and a negative channel error 19 is incorporated to the right of the maximum. In reality, the channel errors would not be visible on this scale either. In order, however, to illustrate the mode of action of the method, the amplitudes of the two channel errors are represented approximately a factor of 10 larger than in reality.

The signal after the high-pass filtering in accordance with step II) is represented by curve 20. As can be seen, the high-pass filter eliminates the "long-wave structure" of the actual object. It only detects rapid signal changes, such as indeed the two channel errors 18 and 19 which become apparent in curve 20 through distinct amplitudes 22. However, in addition to the channel errors, the sharply rising edges of the cylinder are also detected in an undesirable manner. At first sight, the signal responses 21 of the edges appear exactly like channel errors. Upon looking more closely, however, it can be seen that the amplitudes of the edges 21 are significantly larger. It shall be noted once again that the simulated channel errors 18 and 19 are represented approximately ten times larger than in reality. The amplitudes 22 of the channel errors in the high-pass-filtered signal are also accordingly smaller. It is precisely owing to this difference in size between amplitudes of the object edges and those of the channel errors that individual channel errors can be isolated in the method according to an embodiment of the invention.

Finally, curve 23 shows the high-pass-filtered curve after a subsequent medium filtering. The medium filter reduces the weaknesses of the high-pass filter by attenuating undershoots and overshoots.

The mode of action of the entire method or its most important steps will now be illustrated with reference to FIGS. 5a to 5j below. The starting figure is FIG. 5a, which is intended to represent a theoretical sinogram. It comprises on the left-hand side (with the empirically fixed amplitude 100) the structure of a sharp object 24 in the projection direction, as may be caused for example by a skull bone which has a width of only one to a few channels. A temporally limited channel error 25 (with the smaller amplitude 10) is situated in the center and a permanent channel error 26 (with the amplitude −10) is represented at the right-hand edge. As is customary in a sinogram, the horizontal axis represents the channel direction $\beta$ and the vertical axis represents the projection direction $\alpha$.

Figure 5F:
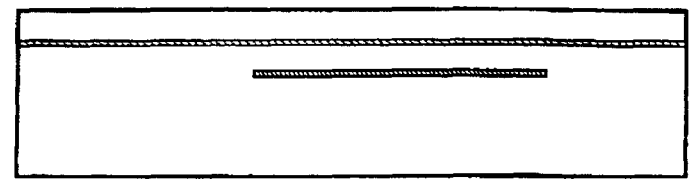
Figure 5E:
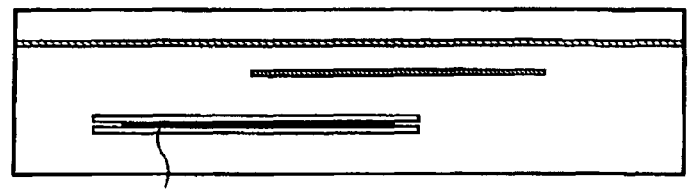
Figure 5D:
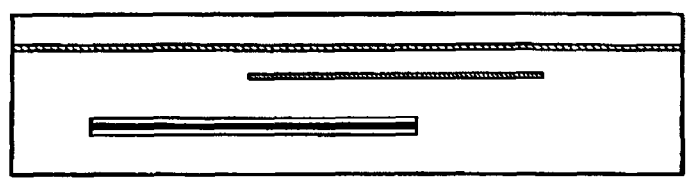
Figure 5C:
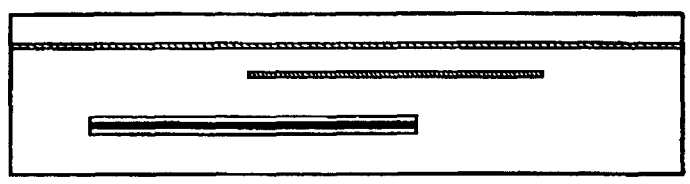
Figure 5B:
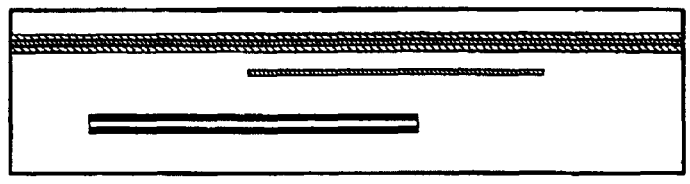
Figure 5A:
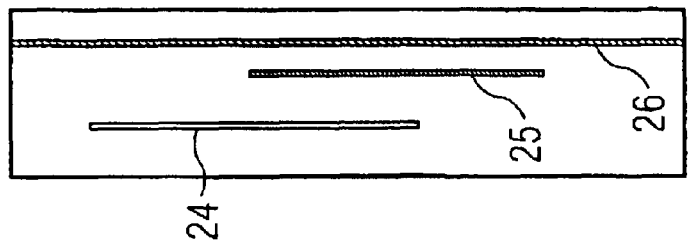

FIG. 5b represents the sinogram after the high-pass filtering (step 1). As can readily be seen, the high-pass filter "smears" all the structures in the image, which is attributable to the property of the convolution function.

The disadvantageous effect of "smearing" in the channel direction can largely be compensated for by the median filter, as is illustrated in FIG. 5c.

FIG. 5d shows the sinogram after the step of short-range smoothing (first low-pass filtering in accordance with step III)), which, although not necessary in this exemplary embodiment since the data do not contain any noise, is to be applied for completeness.

From this point—in the differentiation step in accordance with step IV)—the old balancing method differs from the method according to an embodiment of the invention:

Let $P_{k,n}$ be the data (channel amplitude) of a point in the sinogram after step III) of the old method, where K indexes the channel and N the projection; in that case, in accordance with the previous method, the derivative is realized numerically by means of a nearest neighbor difference in the projection direction:

$$D_{k,n} = P_{k,n} - P_{k,n-1}$$

If the magnitude of the derivative exceeds a specific threshold g, i.e. $D_{k,n}| > g$, then the assigned data point is removed, i.e. $P_{k,n} = 0$.

FIG. 5e clearly reveals that the structure 24 of the object cannot be identified as such, and therefore cannot be removed either, on the basis of the above method. This is true since differentiation is effected exclusively in the vertical direction (that is to say in the projection direction). But in this direction only two points, namely the start point and the end point of the structure, have a corresponding amplitude difference with respect to the neighboring region.

In FIG. 5f, according to an embodiment of the invention, the differentiation is performed in the projection direction and in the channel direction:
instead of the simple derivative in the projection direction, a weighted gradient is calculated whose magnitude specifies the amplitude of the largest change—initially in the channel direct and projection direction:

$$G^x_{k,n} = P_{k,n} - P_{k-1,n}$$

$$G^y_{k,n} = P_{k,n} - P_{k,n-1}$$

The localization of the amplitude change in the projection direction is unproblematic owing to the subsequent long-range smoothing. In the channel direction, however, sharp detection must be effected since otherwise, in the worst-case scenario, an edge one channel wide remains, which is later manifested as a ring in the image. The following definition also takes account of the symmetry of the channel axis:

$$G_{k,n} = (G^x_{k,n}/g^x)^2 + (G^x_{k+1,n}/g^x)^2 + G^y_{k,n}/g^y)^2$$

The parameters $g^x$ and $g^y$ are defined empirically and serve as scale parameters which compensate for the asymmetry between rejection direction and channel direction and simultaneously comprise the detection threshold values. Edges of object structures in an arbitrary direction can then be identified by the condition $$G_{k,n} > 1$$

and treated analogously to the previous procedure. Since, in FIG. 5d, a large change amplitude of the object structure in the channel direction is present and this is far higher than that of the remaining channel errors, this is identified as such and can be removed from the sinogram.

Afterward, the amplitude limiting step (step 5) was performed on both FIGS. 5e and 5f, which does not become apparent, however, in these examples—like already the noise suppression, step III).

Advantages of the method according to an embodiment of the invention and disadvantages of the previous method can clearly be read from FIGS. 5g and 5h:

In the context of the long-range smoothing (second low-pass filter, step VI)), the object structure 24 is drawn beyond its boundaries in the projection direction and corrupted in the case of the old method in accordance with FIG. 5g. In the case of the method according to an embodiment of the invention, this step has no influence on the object since the object structure has, after all, already been identified and removed by means of the differentiation according to an embodiment of the invention. All that remain in the sinogram after the method according to an embodiment of the invention are the two channel errors 25, 26. Since FIGS. 5g and 5h represent the respective correction sinograms which are subtracted from the starting sinogram, FIG. 5i supplies a corrupted sinogram in that the object structure has been lengthened by the last step of long-range smoothing, which becomes apparent through ring-like artifacts in the final CT image. FIG. 5j, however, represents a sinogram in which the channel errors have been almost completely eliminated and the object structure has been maintained uncorrupted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for suppressing artifacts in computed tomography raw data, on the basis of the determination and subsequent subtraction of a correction sinogram from a measured starting sinogram, the method including the following steps for determining a correction sinogram:

high-pass filtering of a starting sinogram in a channel direction to filter out long-wave structures caused by anatomical objects;

low-pass filtering the high-pass-filtered sinogram in a projection direction in order to improve the signal-to-noise ratio;

forming a magnitude of a weighted gradient of each data point in the low-pass-filtered sinogram, both in the projection direction and symmetrically about the corresponding channel axis, specifying amplitude of a change in an arbitrary direction in the sinogram and elimination of the data point if the change amplitude thereof exceeds a first defined threshold value;

removing residual data points in the low-pass-filtered sinogram if their amplitude exceeds a second defined threshold value; and low-pass filtering a resulting sinogram after removing the residual data points, by averaging in the projection direction.

2. The method as claimed in claim 1, wherein a correction sinogram thus obtained is subtracted from the starting sinogram.

3. The method as claimed in claim 1, wherein the high-pass filtering step is followed by median filtering of the high-pass-filtered sinogram in the channel direction.

4. The method as claimed in claim 1, wherein the gradient is weighted by empirically defined scale parameters with regard to at least one of the channel and projection direction.

5. The method as claimed in claim 1, wherein the smoothing interval is significantly shortened in the second low-pass filtering step.

6. The method as claimed in claim 1, wherein, in order to reduce the computation time, as an initial step of the method, the number of projections used for the correction is reduced by an averaging compression in the projection direction and is decompressed again after the entire correction by use of an inverse procedure.

7. A computed tomography apparatus for carrying out the method as claimed in claim 1, comprising a computer in which the steps are carried out.

8. A computer software product, adapted to implement the method as claimed in claim 1 upon being loaded on a computing device associated with a computed tomography apparatus.

9. The method as claimed in claim 2, wherein the high-pass filtering step is followed by median filtering of the high-pass-filtered sinogram in the channel direction.

10. The method as claimed in claim 2, wherein the gradient is weighted by empirically defined scale parameters with regard to at least one of the channel and projection direction.

11. The method as claimed in claim 3, wherein the gradient is weighted by empirically defined scale parameters with regard to at least one of the channel and projection direction.

12. The method as claimed in claim 2, wherein the smoothing interval is significantly shortened in the second low-pass filtering step.

13. The method as claimed in claim 3, wherein the smoothing interval is significantly shortened in the second low-pass filtering step.

14. The method as claimed in claim 2, wherein, in order to reduce the computation time, as an initial step of the method, the number of projections used for the correction is reduced by an averaging compression in the projection direction and is decompressed again after the entire correction by use of an inverse procedure.

15. The method as claimed in claim 3, wherein, in order to reduce the computation time, as an initial step of the method, the number of projections used for the correction is reduced by an averaging compression in the projection direction and is decompressed again after the entire correction by use of an inverse procedure.

16. A computed tomography apparatus for carrying out the method as claimed in claim 2, comprising a computer in which the steps are carried out.

17. A computed tomography apparatus for carrying out the method as claimed in claim 3, comprising a computer in which the steps are carried out.

18. A computed tomography apparatus for carrying out the method as claimed in claim 6, comprising a computer in which the steps are carried out.

19. A computer software product, adapted to implement the method as claimed in claim 2 upon being loaded on a computing device associated with a computed tomography apparatus.

20. A computer software product, adapted to implement the method as claimed in claim 3 upon being loaded on a computing device associated with a computed tomography apparatus.

21. A computer software product, adapted to implement the method as claimed in claim 6 upon being loaded on a computing device associated with a computed tomography apparatus.

22. A method for suppressing artifacts in computed tomography raw data, comprising:

high-pass filtering a starting sinogram in a channel direction;

low-pass filtering in a projection direction;

forming a magnitude of a weighted gradient of each data point in the low-pass-filtered sinogram, both in the projection direction and symmetrically about the corresponding channel axis, wherein a data point is eliminated if a change amplitude thereof exceeds a first threshold value;

removing residual data points in the low-pass-filtered sinogram if their amplitude exceeds a second defined threshold value; and low-pass filtering a resulting sinogram and subtracting it from the starting sinogram.

23. A computed tomography apparatus for carrying out the method as claimed in claim 22, comprising a computer in which the steps are carried out.

24. A computer software product, adapted to implement the method as claimed in claim 22 upon being loaded on a computing device associated with a computed tomography apparatus.

25. The method as claimed in claim 22, wherein the high-pass filtering step is followed by median filtering of the high-pass-filtered sinogram in the channel direction.

26. The method as claimed in claim 22, wherein the gradient is weighted by empirically defined scale parameters with regard to at least one of the channel and projection direction.

27. The method as claimed in claim 22, wherein the smoothing interval is significantly shortened in the second low-pass filtering step.

28. The method as claimed in claim 22, wherein, in order to reduce the computation time, as an initial step of the method, the number of projections used for the correction is reduced by an averaging compression in the projection direction and is decompressed again after the entire correction by use of an inverse procedure.

* * * * *